United States Patent [19]

Tropsch et al.

[11] Patent Number: 5,922,814
[45] Date of Patent: Jul. 13, 1999

[54] PREPARATION OF POLYMERS COMPRISING PEROXYCARBOXYL GROUPS

[75] Inventors: Jürgen Tropsch, Römerberg; Jörg Breitenbach, Mannheim, both of Germany

[73] Assignee: BASF Aktiengesellschaft, Ludwigshafen, Germany

[21] Appl. No.: 09/089,483

[22] Filed: Jun. 2, 1998

Related U.S. Application Data

[63] Continuation-in-part of application No. 08/813,979, Mar. 10, 1997, Pat. No. 5,804,669.

[51] Int. Cl.$^6$ ............................................. C08F 8/06
[52] U.S. Cl. ................... 525/326.9; 525/387; 526/264
[58] Field of Search ................... 526/264; 525/326.9

[56] References Cited

U.S. PATENT DOCUMENTS

| | | | |
|---|---|---|---|
| 2,676,949 | 4/1954 | Morner et al. | 526/264 |
| 2,997,464 | 8/1961 | Sellers | 525/387 |
| 3,002,954 | 10/1961 | Sellers | 525/387 |
| 3,496,150 | 2/1970 | Kropp | 260/78.4 |
| 3,592,948 | 7/1971 | Rafford et al. | 525/387 |
| 3,634,503 | 1/1972 | Bowman | 260/537 |
| 3,850,891 | 11/1974 | Crawford | 260/78.5 |
| 3,975,332 | 8/1976 | Anderson et al. | 525/387 |
| 4,424,079 | 1/1984 | Barabas | 526/264 |

FOREIGN PATENT DOCUMENTS

| | | |
|---|---|---|
| 252 378 | 7/1986 | Germany . |
| 272 654 | 3/1987 | Germany . |
| 995 880 | 6/1962 | United Kingdom . |
| 93/07185 | 4/1993 | WIPO . |

*Primary Examiner*—Bernard Lipman
*Attorney, Agent, or Firm*—Keil & Weinkauf

[57] ABSTRACT

A process for preparing polymers comprising peroxycarboxyl groups, wherein a suspension of a polymer comprising monoolefinically unsaturated dicarboxylic anhydride basic building blocks is mixed with hydrogen peroxide in an inert diluent.

4 Claims, 1 Drawing Sheet

PREPARATION OF POLYMERS COMPRISING PEROXYCARBOXYL GROUPS

This is a Continuation-In-Part Application of Application Ser. No 08/813,979, filed on Mar. 10, 1997, now U.S. Pat. No. 5,804,669.

The present invention relates to a process for preparing polymers comprising peroxycarboxyl groups, to suitable employable polymers and products of the process, and to the use thereof.

DD A-A-252 378 describes a process for preparing uncrosslinked polymer percarboxylates, wherein uncrosslinked polymers comprising maleic and/or fumaric acid are dissolved in an inert solvent which is difficult to oxidize, then hydrogen peroxide is added, and the product is isolated as a solid product under reduced pressure at temperatures below 100° C. In the process described, the ratio between maleic acid copolymer basic units and hydrogen peroxide is preferably from 1:2 to 1:4. In order to obtain yields of percarboxylate to COOH of 60% and more it is necessary for the ratio of maleic acid units to hydrogen peroxide to be 1:2 or more. Partially hydrolyzed or hydrolyzed maleic acid copolymers are employed.

DD-A-272 654 describes a process for preparing copolymeric peroxydicarboxylic acids and their salts, wherein copolymeric dicarboxylic anhydrides are reacted with hydrogen peroxide in the absence of solvents and catalysts in heterogeneous phase. Active oxygen contents of from 3.1 to 5.8% are achieved.

It is an object of the present invention to provide a process for preparing polymers comprising peroxycarboxyl groups by reacting polymers comprising monoolefinically unsaturated dicarboxylic anhydride basic building blocks with hydrogen peroxide, it being possible to produce a high proportion of peroxycarboxyl groups with a small amount of hydrogen peroxide.

It is another object of the present invention to provide a process as described above, it being possible to isolate the product in a simple manner.

It is another object of the invention to provide a process as described above, wherein the content of peroxycarboxyl groups in the product can be controlled in a simple manner.

It is another object of the invention to provide a process for preparing crosslinked or partially crosslinked polymers comprising peroxycarboxyl groups.

It is another object of the invention to provide novel polymers comprising peroxycarboxyl groups.

It is another object of the invention to provide novel polymers comprising monoolefinically unsaturated dicarboxylic anhydride basic building blocks which can be converted into polymers comprising peroxycarboxyl groups.

We have found that these objects can be achieved by a process for preparing polymers comprising peroxycarboxyl groups, wherein hydrogen peroxide is added to a suspension of a polymer comprising monoolefinically unsaturated dicarboxylic anhydride basic building blocks in an inert diluent and a copolymer comprising at least one monoolefinically unsaturated dicarboxylic anhydride and at least one N-vinyllactam as basic building blocks.

In the process according to the invention, the polymers comprising monoolefinically unsaturated dicarboxylic anhydride basic building blocks are suspended in an inert solvent and reacted with a required amount of hydrogen peroxide according to one embodiment according to the invention in a two-phase reaction. In this case it is possible to control the content of peroxycarboxyl groups in the polymers simply via the amount of hydrogen peroxide added.

The polymer comprising monoolefinically unsaturated dicarboxylic anhydride basic building blocks which is used according to the invention can be, preferably, a homopolymer, copolymer, terpolymer, graft copolymer or block copolymer or another polymer.

The polymer used according to the invention can be a copolymer of at least one monoolefinically unsaturated dicarboxylic anhydride basic building block and at least one monoethylenically unsaturated comonomer basic building block.

BRIEF DESCRIPTION OF THE DRAWINGS

The figure depicts the decomposition of the disclosed polymers as compared to peroxide solutions.

Monoolefinically Unsaturated Dicarboxylic Anhydride Basic Building Blocks

Figure 1:
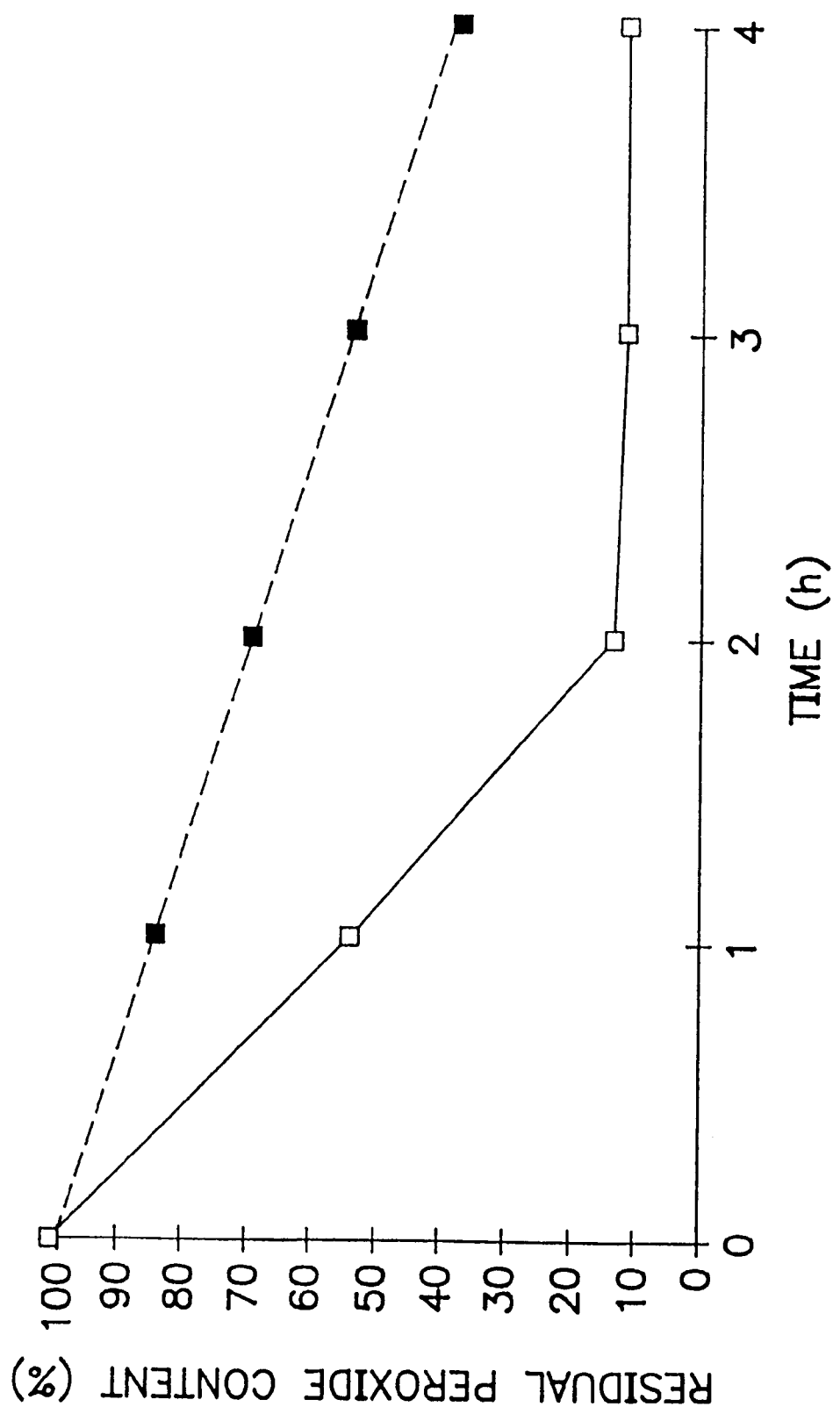

Examples of possible monoolefinically unsaturated dicarboxylic anhydride basic building blocks are cyclic dicarboxylic anhydrides which have a monoolefinic unsaturation in the ring structure. Examples of such dicarboxylic anhydrides are maleic, citraconic and glutaconic anhydrides. These anhydrides may be substituted by one or more $C_1$–$C_{20}$-alkyl radicals, preferably $C_1$–$C_{10}$-alkyl radicals, in particular $C_1$–$C_5$-alkyl radicals, or by aromatic radicals such as phenyl or naphthyl radicals. The cyclic dicarboxylic anhydrides, as well as the alkyl or aryl substituents, may be substituted by suitable inert substituents such as halogen atoms.

The dicarboxylic anhydrides which can be used may also have the monoolefinic unsaturation outside the cyclic anhydride structure, for example through an attached olefinic radical. Examples are methylenemalonic anhydride, itaconic anhydride, 1,2,3,6-tetrahydrophthalic anhydride, 3-methyl-1,2,3,6-tetrahydrophthalic anhydride, 2-methyl-1,2,3,6-tetrahydrophthalic anhydride, 3,6-epoxy-1,2,3,6-tetrahydrophthalic anhydride, 5-norbornene-2,3-dicarboxylic anhydride and bicyclo[2.2.2]-5-octene-2,3-dicarboxylic anhydride.

Maleic anhydride is preferably used.

Monoethylenically Unsaturated Comonomner Basic Building Blocks

All suitable basic building blocks can be used as monoethylenically unsaturated comonomer basic building blocks. Examples of suitable basic building blocks are N-vinyllactams, preferably N-vinylpyrrolidone, N-vinylpiperidone, N-vinylcaprolactam, which may be substituted by one or more substituents as described above for the dicarboxylic anhydrides. N-vinylpyrrolidone and/or N-vinylcaprolactam are particularly preferably employed, especially in combination with maleic anhydride as monoolefinically unsaturated dicarboxylic anhydride basic building block.

Another group of suitable monoethylenically unsaturated comonomers are the N-vinylamides such as N-vinylformamide or N-vinylacetamide.

It is furthermore possible to use vinyl ethers, for example $C_1$–$C_{20}$-alkyl vinyl ethers, preferably $C_1$–$C_{10}$-alkyl vinyl ethers, particularly preferably $C_1$–$C_4$-alkyl vinyl ethers, for example methyl, ethyl, n-propyl, i-propyl, n-butyl, i-butyl, octyl, cyclohexyl, 2-ethylhexyl, dodecyl and octadecyl vinyl ethers.

It is furthermore possible to use vinyl esters, for example vinyl formate, vinyl acetate and vinyl propionate.

It is additionally possible to employ vinylaromatic compounds such as styrene and α-methylstyrene.

It is likewise possible to use acrylic and methacrylic acids, as well as acrylic esters and methacrylic esters, and acrylamides and methacrylamides. Examples thereof are methyl acrylate, ethyl acrylate, propyl acrylate, i-propyl acrylate, butyl acrylate, i-butyl acrylate, t-butyl acrylate, pentyl acrylate, hexyl acrylate, 2-ethylhexyl acrylate, octyl acrylate, lauryl acrylate, stearyl acrylate and the corresponding methacrylates, mono- and disubstituted acrylamides and methacrylamides such as N-methylacrylamide, N-ethylacrylamide, N-propylacrylamide, N-i-propylacrylamide, N-t-butylacrylamide, N-butylacrylamide, N-hexyl-acrylamide, N-octylacrylamide, N,N-dimethylacrylamide, N,N-diethylacrylamide and the corresponding methacrylamides.

Another group of suitable comonomers are the monoolefinically unsaturated dicarboxylic anhydrides described above.

It is furthermore possible to use olefins such as $C_2$–$C_{30}$-olefins, for example ethene, propene, isobutene, 1-butene, 1-pentene, 1-hexene, 1-octene, 1-decene, 1-dodecene, 1-tetradecene, 1-hexadecene, 1-octadecene, and commercial mixtures of higher olefins such as $C_{12}/C_{14}$-olefins, $C_{12}/C_{16}$-olefins, $C_{20}/C_{24}$-olefins, $C_{24}/C_{28}$-olefins.

Particularly preferred monoethylenically unsaturated comonomer basic building blocks are N-vinylpyrrolidone, $C_1$–$C_4$-vinyl ethers and $C_2$–$C_8$-olefins.

The (co)monomers can be employed singly or in a mixture.

The molar ratio of unsaturated dicarboxylic anhydride basic building blocks to monoethylenically unsaturated comonomer basic building blocks can be chosen as required for the desired polymer. The ratio is preferably from 20:1 to 1:20, particularly preferably 10:1 to 1:10, in particular 5:1 to 1:5.

In one embodiment of the invention in which N-vinyllactam basic building blocks are used, the molar ratio of monoolefinically unsaturated dicarboxylic anhydride basic building blocks to N-vinyllactam basic building blocks is from 20:1 to 1:20, preferably 5:1 to 1:5, in particular 2:1 to 1:2.

In these copolymers according to one embodiment of the invention, 1 to 95%, preferably 30 to 95%, of the monoolefinically unsaturated dicarboxylic anhydride basic building blocks are converted into monoolefinically unsaturated monoperoxydicarboxylic acid basic building blocks.

Crosslinkers

The polymers employed according to the invention can in one embodiment of the invention be partially or completely crosslinked. Crosslinkers which can be employed are any suitable crosslinkers. Examples of suitable crosslinkers are:
-alkadienes, eg. α,ω-alkadienes such as 1,9-decadiene
-divinyl alkyl ethers, eg. 1,4-butanediol divinyl ether, 1,6-hexanediol divinyl ether, 1,8-octanediol divinyl ether
-di(meth)acrylates of diols, eg. ethylene glycol di(meth)acrylate, 1,2-propylene glycol di(meth)acrylate, 1,4-butanediol di(meth)acrylate, 1,6-hexanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate or polyethylene glycol di(meth)acrylate
-tri(meth)acrylates of polyhydric alcohols, eg. trimethylolpropane tri(meth)acrylate
-allyl esters, eg. allyl (meth)acrylate
-allyl ethers of polyhydric alcohols, eg. pentaerythritol triallyl ether
-N,N'-divinylalkyleneureas, eg. divinylethyleneurea, divinylpropyleneurea
-methylenebis(meth)acrylamide
-divinylbenzene.

The polymers used according to the invention can also be partially crosslinked subsequently. To do this, the polymers can be reacted, before or during the reaction with hydrogen peroxide, with diols and/or diamines as crosslinkers. Examples of diols suitable as crosslinkers are ethanediol, 1,2-propanediol, 1,3-propanediol, 1,2-butanediol, 1,4-butanediol, 1,5-pentanediol, 1,2-pentanediol, 1,3-hexanediol, 1,6-hexanediol. Examples of diamines which can be used are ethanediamine, 1,2-propanediamine, 1,3-propanediamine, 1,2-butanediamine, 1,4-butanediamine, 1,5-pentanediamine, 1,2-pentanediamine, 1,2-hexanediamine, 1,6-hexanediamine.

The crosslinkers can be employed in suitable amounts depending on the required degree of crosslinking. Only small amounts of crosslinker are normally employed, for example from 0.001 to 10, preferably 0.01 to 5, % of the total weight of the other basic building blocks.

The copolymers according to the invention, which comprise at least one monoolefinically unsaturated dicarboxylic anhydride basic building block, preferably maleic anhydride basic building block and at least one N-vinyllactam basic building block, preferably N-vinylpyrrolidone and/or N-vinylcaprolactam basic building block, are, in one embodiment of the invention, at least partially crosslinked by divinylbenzene and/or divinylethyleneurea and/or alkadienes and/or divinyl alkyl ethers and/or diols and/or diamines. According to a preferred embodiment of the invention, the copolymers according to the invention are prepared by the process described hereinafter.

The crosslinker basic building blocks preferably employed are divinylbenzene, divinylethyleneurea, alkadienes or divinyl alkyl ethers. The latter are preferably selected from α,ω-alkadienes, preferably 1,9-decadiene, or 1,4-butanediol divinyl ether, 1,6-hexanediol divinyl ether or 1,8-octanediol divinyl ether.

The polymers employed according to the invention can have any suitable molecular weight, preferably a number average molecular weight of from 1000 to 5,000,000, preferably 2000 to 1,000,000.

Diluents

The polymers or copolymers used to prepare the polymers comprising peroxycarboxyl groups according to the invention are, according to one embodiment of the invention, suspended in a diluent which does not dissolve either the initial polymer or the product. Thus, diluents which can be used are all diluents in which neither the initial polymer nor the product dissolve. In addition, the diluents should preferably be inert, ie. show essentially no reaction with hydrogen peroxide. Examples of diluents which can be used are aromatic compounds such as benzene, toluene, o-xylene, m-xylene, p-xylene, and carboxylic esters, for example methyl acetate, ethyl acetate, isopropyl acetate, butyl acetate, amyl acetate, alkanes such as hexane, heptane, octane, nonane, decane or isomers thereof or mixtures of alkanes. Other suitable diluents are known to the skilled worker.

The inert diluent is preferably a diluent which is immiscible or of low miscibility with water.

Ethyl acetate or an alkane, such as hexane or heptane, is preferably used.

The reaction products can be isolated from the diluent in a simple manner, for example by filtration or by decantation. The resulting products can then be dried at suitable temperatures, for example up to 50° C., under reduced pressure.

Preparation Process

According to one embodiment of the invention, the initial polymer(s) are suspended in a suitable inert diluent and, at a temperature in the range from 0° to 70° C., preferably 20° to 55° C., a required amount of hydrogen peroxide, preferably aqueous hydrogen peroxide, is added. The content of peroxycarboxyl groups in the product polymer can be influenced by the ratio of hydrogen peroxide to dicarboxylic anhydride basic building blocks in the polymer. According to one embodiment of the invention, the amount of hydrogen peroxide employed is 0.01 to 1.5, preferably 0.1 to 1.5, especially 0.3 to 1.5 mol of hydrogen peroxide per mole of dicarboxylic anhydride in the initial polymer.

The reaction time can be adjusted according to the required content of peroxycarboxyl groups in the product and according to the reaction temperature. The reaction time is preferably from 0.1 to 8 hours, particularly preferably 0.5 to 6 hours.

The polymers used as starting materials can be employed already in the form of solids, which are suspended in the diluent. According to one embodiment of the invention, the initial polymers can be prepared by suspension polymerization or precipitation polymerization and be reacted further, without previous isolation, with hydrogen peroxide, with or without diols and/or diamines. It is preferable to use for the polymerization a diluent which is a suitable diluent for the subsequent reaction with hydrogen peroxide. This reaction procedure makes it possible to prepare polymers comprising peroxycarboxyl groups very simply.

The hydrogen peroxide is preferably employed as an aqueous solution which has a hydrogen peroxide content of from 10 to 100% by weight, preferably 30 to 60% by weight.

The polymers comprising peroxycarboxyl groups obtained from the reaction with hydrogen peroxide can furthermore, according to one embodiment of the invention, be converted into their alkali metal or alkaline earth metal salts before isolation from the reaction mixture. This preferably takes place by adding aqueous alkali metal or alkaline earth metal hydroxides, bicarbonates or carbonates.

The polymer comprising peroxycarboxyl groups can be isolated from the reaction mixture by filtration or decantation.

The products prepared according to the invention contain, depending on the amount of hydrogen peroxide employed, from 1 to 95% of monoperoxycarboxyl groups based on the total amount of dicarboxylic anhydride groups in the initial polymer. According to one embodiment of the invention, these high contents of monoperoxycarboxyl groups are also obtained on use of water-containing hydrogen peroxide solution. Surprisingly, even with aqueous hydrogen peroxide solution there is incorporation into the polymer predominantly of hydrogen peroxide by comparison with water.

The bound amount of active oxygen can be determined, for example, by iodometric titration.

The polymers comprising peroxycarboxyl groups prepared according to the invention can be used in a wide range of applications, for example as bleaches, disinfectants, cleaners or for epoxidation. Applications both in the cosmetic and in the pharmaceutical sectors are possible. Examples of such applications are in the sectors: acne remedies, tooth bleaches, or lightening of the teeth, non-aqueous toothpastes and tooth powders, cleaning of dentures and orthodontic appliances, foaming mouthwash tablets, hair removers (oxidizing depilatories), hair bleaches, bleaching of the skin, coupling agents in hair dyeing and production of permanent waves (alkali cold wave), softening of cuticle, for example in foot care, incorporation in deep bed filter systems, filled tamponades for simultaneous absorption and disinfection, disinfecting wipes, disinfectants for medical instruments, surface disinfection, water disinfection, vaginal suppositories, non-aqueous ointments, for example polyethylene-based ointments, antibacterial lipsticks, wound dressings, wound powders, contact lens cleaning, cold wash tablets. The products according to the invention are likewise suitable for use in chemical reactions, for example in the preparation of N-oxides, epoxides, for the oxidation of alcohols and aldehydes and other compounds, for use as initiators in polymerizations, such as solution, emulsion, precipitation and suspension polymerizations with all known suitable monomers and combinations thereof in homo- and copolymerizations, or for crosslinking of polymers.

The invention is explained hereinafter by means of examples.

The vinylpyrrolidone/maleic anhydride molar ratio in all the examples is 1:1.

Preparation of the Polymers Comprising
Peroxycarboxyl Groups

Example 1

10 g of a copolymer of N-vinylpyrrolidone and maleic anhydride are introduced into a glass flask which has a capacity of 100 ml and is equipped with a stirrer and are suspended in 50 ml of ethyl acetate. 0.96 g of $H_2O_2$ (50%, equivalent of 30 mol % based on the maleic anhydride content) is then added to the suspension. The mixture is stirred at 25° C. for 4 hours, after which the polymer comprising peroxycarboxyl groups is isolated by filtration. The product has a bound content of $H_2O_2$ of 2.5% (corresponding to 54.0% of theory).

Example 2

10 g of a copolymer of N-vinylpyrrolidone and maleic anhydride are introduced into a glass flask which has a capacity of 100 ml and is equipped with a stirrer and are suspended in 50 ml of ethyl acetate. 3.84 g of $H_2O_2$ (50%, equivalent of 120 mol % based on the maleic anhydride content) are then added to the suspension. The mixture is stirred at 0° C. for 2 hours, after which the polymer comprising peroxycarboxyl groups is isolated by filtration. The product has a bound content of $H_2O_2$ of 7.2% (corresponding to 51.4% of theory).

Example 3

25 g of a copolymer of N-vinylpyrrolidone and maleic anhydride are introduced into a glass flask which has a capacity of 250 ml and is equipped with a stirrer and are suspended in 125 ml of ethyl acetate. 9.6 g of $H_2O_2$ (50%, equivalent of 120 mol % based on the maleic anhydride content) are then added to the suspension. The mixture is stirred at 25° C. for 4 hours, after which the polymer comprising peroxycarboxyl groups is isolated by filtration. The product has a bound content of $H_2O_2$ of 11.1% (corresponding to 79.3% of theory).

Example 4

10 g of a copolymer of N-vinylpyrrolidone and maleic anhydride are introduced into a glass flask which has a capacity of 100 ml and is equipped with a stirrer and are suspended in 50 ml of ethyl acetate. 4.79 g of $H_2O_2$ (50%, equivalent of 150 mol % based on the maleic anhydride content) are then added to the suspension. The mixture is stirred at 50° C. for 2 hours, after which the polymer comprising peroxycarboxyl groups is isolated by filtration. The product has a bound content of $H_2O_2$ of 13.3% (corresponding to 95% of theory).

Example 5

10 g of a copolymer of N-vinylpyrrolidone and maleic anhydride are introduced into a glass flask which has a capacity of 100 ml and is equipped with a stirrer and are suspended in 50 ml of ethyl acetate. 4.79 g of $H_2O_2$ (50%, equivalent of 150 mol % based on the maleic anhydride content) are then added to the suspension. The mixture is stirred at 25° C. for 2 hours, after which the polymer comprising peroxycarboxyl groups is isolated by filtration. The product has a bound content of $H_2O_2$ of 10.7% (corresponding to 76.4% of theory).

Example 6

10 g of a copolymer of N-vinylpyrrolidone and maleic anhydride are introduced into a glass flask which has a capacity of 100 ml and is equipped with a stirrer and are suspended in 50 ml of heptane. 4.08 g of $H_2O_2$ (50%, equivalent of 125 mol % based on the maleic anhydride content) are then added to the suspension. The mixture is stirred at 50° C. for 2 hours, after which the polymer comprising peroxycarboxyl groups is isolated by filtration. The product has a bound content of $H_2O_2$ of 11.2% (corresponding to 79.9% of theory).

Example 7

60 g of a copolymer of N-vinylpyrrolidone and maleic anhydride are introduced into a glass flask which has a capacity of 500 ml and is equipped with a stirrer and are suspended in 350 ml of ethyl acetate. 28.74 g of $H_2O_2$ (50%, equivalent of 150 mol % based on the maleic anhydride content) is then added to the suspension. The mixture is stirred at 25° C. for 4 hours, after which the polymer comprising peroxycarboxyl groups is isolated by filtration. The product has a bound content of $H_2O_2$ of 12.45% (corresponding to 88.9% of theory).

Example 8

10 g of a copolymer of N-vinylpyrrolidone and maleic anhydride are introduced into a glass flask which has a capacity of 100 ml and is equipped with a stirrer and are suspended in 50 ml of heptane. 3.36 g of $H_2O_2$ (50%, equivalent of 100 mol % based on the maleic anhydride content) are then added to the suspension. The mixture is stirred at 50° C. for 2 hours, after which the polymer comprising peroxycarboxyl groups is isolated by filtration. The product has a bound content of $H_2O_2$ of 10.3% (corresponding to 73.6% of theory).

Example 9

10 g of a copolymer of N-vinylpyrrolidone and maleic anhydride are introduced into a glass flask which has a capacity of 100 ml and is equipped with a stirrer and are suspended in 50 ml of hexane. 4.79 g of $H_2O_2$ (50%, equivalent of 150 mol % based on the maleic anhydride content) are then added to the suspension. The mixture is stirred at 50° C. for 4 hours, after which the polymer comprising peroxycarboxyl groups is isolated by filtration. The product has a bound content of $H_2O_2$ of 13.0% (corresponding to 93.0% of theory).

Example 10

10 g of a copolymer of N-vinylpyrrolidone and maleic anhydride are introduced into a glass flask which has a capacity of 100 ml and is equipped with a stirrer and are suspended in 50 ml of ethyl acetate. 1.6 g of $H_2O_2$ (10%, equivalent of 10 mol % based on the maleic anhydride content) is then added to the suspension. The mixture is stirred at 25° C. for 4 hours, after which the polymer comprising peroxycarboxyl groups is isolated by filtration. The product has a bound content of $H_2O_2$ of 0.8% (corresponding to 50% of theory).

Example 11

Kinetics of Decomposition of the Polymers Comprising Peroxycarboxyl Groups

The kinetics of decomposition of the polymer comprising peroxycarboxyl groups from Example 7 were compared in a test with the kinetics of decomposition of hydrogen peroxide under the same conditions. The temperature was 90° C., the pH was 2 and the initial peroxide content was 0.2% by weight. The peroxide content was determined by iodometry. The results of the kinetics of decomposition are depicted in the graph in FIG. 1 in which the residual peroxide content is plotted against time. (Full line: polymer from Example 7, broken line: industrially stabilized hydrogen peroxide.) It is evident that the peroxide content in the polymer from Example 7 decreases considerably more quickly than that of a comparable hydrogen peroxide solution. This shows that the polymers comprising peroxycarboxyl groups according to the invention are more suitable as oxidizing agents and as agents for providing active oxygen.

Use of the Polymers Comprising Peroxycarboxyl Groups as Initiators for Polymerizations

Example 12

28.8 g (0.4 mol) of acrylic acid are introduced into 67 g of water in a stirred apparatus fitted with reflux condenser and nitrogen flushing device. 1.36 g of the polymeric peracid from Example 3 are added, and the mixture is heated at 85° C. for 2 hours and then at 95° C. for a further 2 hours. Towards the end of the reaction it is diluted with 125 ml of water. A viscous solution with a solids content of 13% is obtained. the K value* is 30.4.

* The K values were measured by the method of Fikentscher, Cellulosechemie 13 (1932) 58–64 at 25° C., 0.1% by weight in 0.5 molar NaCl solution.

Example 13

30 g (0.23 mol) of hydropropyl acrylate, 60 g (0.09 mol) of N,N-dimethyl-N-ethyl-N-(2-methacryloyloxy) ethylammonium ethyl sulfate (50% strength in water), 110 g of water and 1.12 g of polymeric peracid from Example 3 are introduced into a stirred apparatus fitted with reflux condenser and nitrogen flushing device. The mixture is heated at 90° C. for 2 hours and then at 100° C. for a further 2 h. Towards the end of the reaction it is diluted with 100 ml of water. A viscous solution with a solids content of 20% and a K value* of 51.0 is obtained.

\* The K values were measured by the method of Fikentscher, Cellulosechemie 13 (1932) 58–64 at 25° C., 0.1% by weight in 0.5 molar NaCl solution.

We claim:

1. A copolymer comprising at least one monoolefinically unsaturated dicarboxylic anhydride and at least one N-vinyllactam as basic building blocks wherein from 30 to 95% of the monoolefinically unsaturated dicarboxylic anhydride basic building blocks are converted into monoolefinically unsaturated monoperoxydicarboxylic acid basic building blocks.

2. The copolymer defined in claim 1, having one or more of the following features:

the monoolefinically unsaturated dicarboxylic anhydride basic building block is maleic anhydride and the N-vinyllactam basic building block is N-vinylpyrrolidone or N-vinylcaprolactam or a mixture thereof;

the molar ratio of monoolefinically unsaturated dicarboxylic anhydride basic building blocks to N-vinyllactam basic building blocks is from 20:1 to 1:20;

from 1 to 95% of the monoolefinically unsaturated dicarboxylic anhydride basic building blocks are converted into monoolefinically unsaturated monoperoxydicarboxylic acid basic building blocks;

it is at least partially crosslinked by divinylbenzene or divinylethyleneurea or alkadienes or divinyl alkyl ethers or diols or diamines or a mixture comprising more than one of the foregoing.

3. The copolymer defined in claim 1, wherein the molar ratio of monoolefinically unsaturated dicarboxylic anhydride basic building blocks to N-vinyllactam basic building blocks is from 5:1 to 1:5.

4. The copolymer defined in claim 1, wherein the molar ratio of monoolefinically unsaturated dicarboxylic anhydride basic building blocks to N-vinyllactam basic building blocks is from 2:1 to 1:2.

\* \* \* \* \*

UNITED STATES PATENT AND TRADEMARK OFFICE
CERTIFICATE OF CORRECTION

PATENT NO. : 5,922,814
DATED : July 13, 1999
INVENTOR(S) : TROPSCH et al.

It is certified that error appears in the above-identified patent and that said Letters Patent is hereby corrected as shown below:

```
On the title page, item [30],
    Insert the following priority data

--    Foreign Application Priority Data
   Mar. 19, 1996    [DE]    Germany ................ 196 10 817 --.
```

Signed and Sealed this

Twenty-sixth Day of September, 2000

Attest:

Q. TODD DICKINSON

Attesting Officer

Director of Patents and Trademarks